United States Patent
Renner et al.

(10) Patent No.: US 10,414,206 B2
(45) Date of Patent: Sep. 17, 2019

(54) WHEEL FOR A VEHICLE

(71) Applicant: MUBEA CARBO TECH GMBH, Salzburg (AT)

(72) Inventors: Christoph Renner, Gosau (AT); Sebastian Schmitz, Salzburg (AT)

(*) Notice: Subject to any disclaimer, the term of this patent is extended or adjusted under 35 U.S.C. 154(b) by 156 days.

(21) Appl. No.: 15/522,671

(22) PCT Filed: Oct. 29, 2015

(86) PCT No.: PCT/EP2015/075172
§ 371 (c)(1),
(2) Date: Apr. 27, 2017

(87) PCT Pub. No.: WO2016/066769
PCT Pub. Date: May 6, 2016

(65) Prior Publication Data
US 2017/0334240 A1    Nov. 23, 2017

(30) Foreign Application Priority Data

Oct. 31, 2014  (CH) ........................... 1669/14

(51) Int. Cl.
*B60B 3/04* (2006.01)
*B60B 3/10* (2006.01)
*B60B 5/02* (2006.01)
*B60B 23/06* (2006.01)

(52) U.S. Cl.
CPC ............. *B60B 3/045* (2013.01); *B60B 3/041* (2013.01); *B60B 3/10* (2013.01); *B60B 5/02* (2013.01); *B60B 23/06* (2013.01)

(58) Field of Classification Search
CPC ........... B60B 3/045; B60B 23/06; B60B 5/02; B60B 3/041; B60B 3/10

USPC .................................................... 301/63.102
See application file for complete search history.

(56) References Cited

U.S. PATENT DOCUMENTS

| 2,805,894 | A   |   | 9/1957  | Gilbert |              |
|-----------|-----|---|---------|---------|--------------|
| 6,592,189 | B1  | * | 7/2003  | Back, Sr. | A63C 17/22 |
|           |     |   |         |         | 152/47       |
| 7,464,095 | B2  | * | 12/2008 | Vadavia | G06F 17/3056 |
| 2011/0089749 | A1 | * | 4/2011 | Kleber | B22D 15/005 |
|           |     |   |         |         | 301/64.307   |
| 2014/0346845 | A1 | * | 11/2014 | Renner | B60B 3/004  |
|           |     |   |         |         | 301/37.42    |

(Continued)

FOREIGN PATENT DOCUMENTS

EP    1 858 715 B1   11/2009
FR    1 114 895 A    4/1956

(Continued)

*Primary Examiner* — S. Joseph Morano
*Assistant Examiner* — Jean W Charleston
(74) *Attorney, Agent, or Firm* — Pauley Erickson & Kottis

(57) ABSTRACT

The invention is directed to a wheel comprising a rim (2) and a wheel center (3) interconnected to the rim (2). The rim (2) comprises at least one first contact area (12) and the wheel center (3) comprises at least one second contact area (13) which in a mounted state are aligned with respect to each other. According to the invention an intermediate layer (22) is arranged between the at least one first contact area (12) and the at least one second contact area (13) preventing at least partially direct contact between the at least one first contact area (12) and the at least one second contact area (13).

22 Claims, 3 Drawing Sheets

(56) References Cited

U.S. PATENT DOCUMENTS

2016/0325582 A1* 11/2016 Werner .................. B60B 3/041

FOREIGN PATENT DOCUMENTS

| WO | WO 98/33666 A1 | 8/1998 |
| WO | WO 2006/097856 A2 | 9/2006 |
| WO | WO 2007/146260 A2 | 12/2007 |
| WO | WO 2013/045618 A1 | 4/2013 |
| WO | WO 2014/058313 A1 | 4/2014 |
| WO | WO 2015/090276 A1 | 6/2015 |
| WO | WO 2015/106760 A1 | 7/2015 |

* cited by examiner

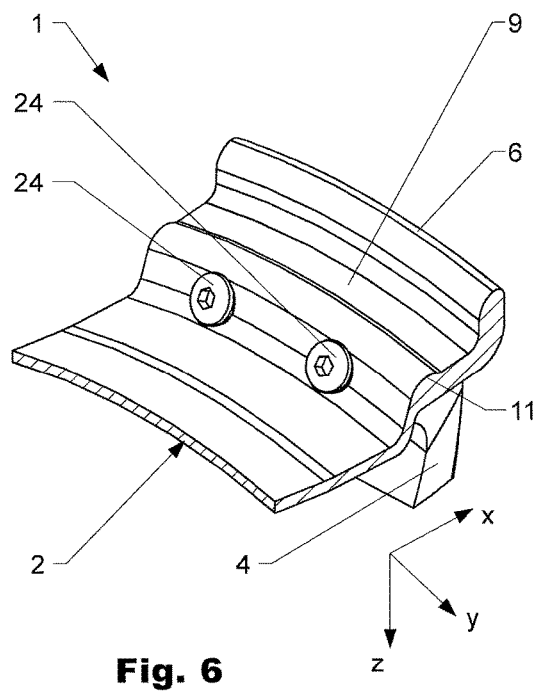
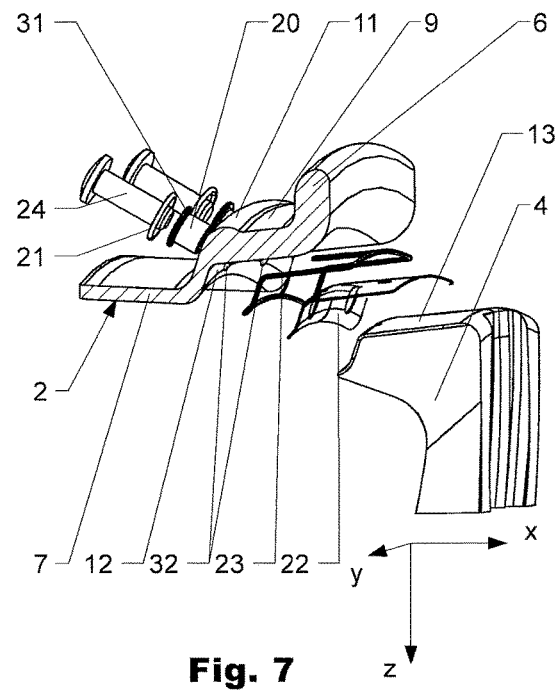
Fig. 6        Fig. 7
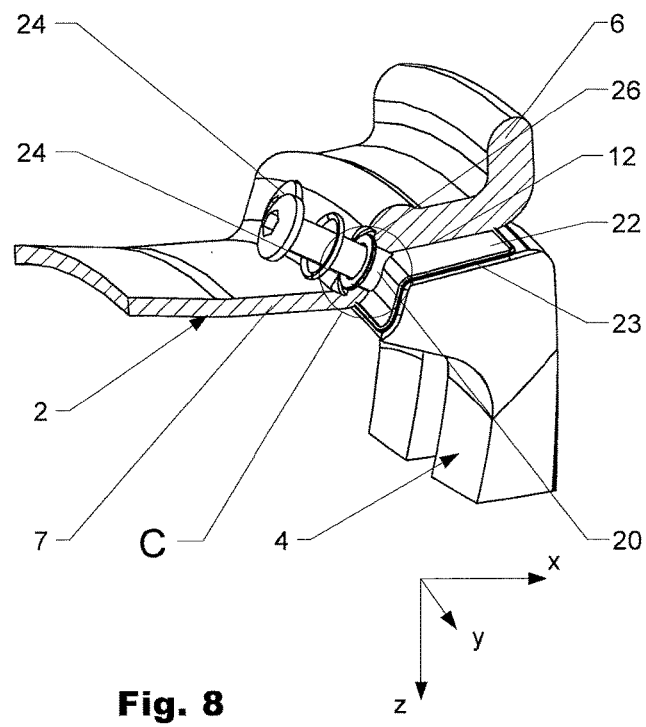
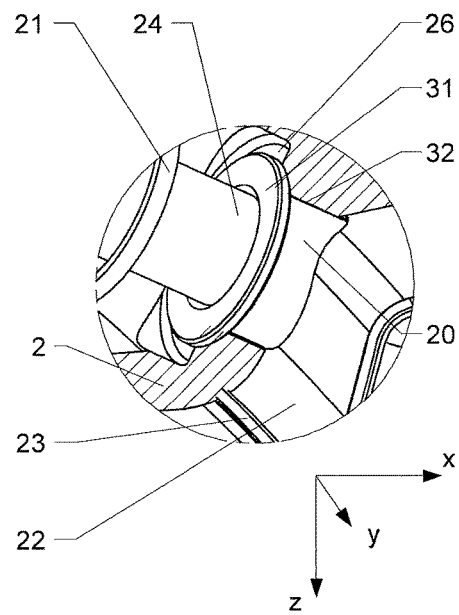
Fig. 8        Fig. 9

WHEEL FOR A VEHICLE

BACKGROUND OF THE INVENTION

Field of the Invention

The present invention is directed to a wheel for a vehicle comprising a rim and a wheel center.

Discussion of Related Art

WO 2006/097856 A2 was published on Sep. 21, 2006 on behalf of Dymag Racing UK Ltd. and discloses a vehicle wheel that comprises a rim made from a plastic material and a spoke unit or wheel disk made from a metal. The spoke unit or wheel disk is connected to the rim by means of at least one connecting element that is guided through the rim base.

WO 2013/045618 A1 was published on Apr. 4, 2013 on behalf of Washi Kosan Co. Ltd. and discloses a wheel that comprises a rim made from a carbon fibers reinforced plastic and a wheel spider made from a metal alloy. According to the application, the wheel spider can be fastened to the rim by means of a clamping ring. The application shows an embodiment of a wheel where the clamping ring is arranged in the center of the wheel and is fastened to the wheel spider by means of screws, while clamping a portion of the rim well.

WO 2014/058313 A1 was published on Apr. 15, 2014 on behalf of Louis Huide-koper and shows a vehicle wheel with a rim and a wheel center made from two different materials. According to the document, the rim may be made from polymers reinforced with glass fibers, carbon fibers and others. The wheel center may be made from a metal. The rim comprises a circumferential edge at its radially inner side. The wheel center and edge comprise openings suited to receive connecting elements. The openings in the edge or the openings in the wheel center have a radially elongated shape, intended to reduce stress induced when materials with different coefficients of thermal expansion are heated.

For the wheels known from the prior art in general the junction between the wheel center and the rim turns out to be critical with respect to the durability of a wheel.

SUMMARY OF THE INVENTION

Wheels for vehicles must meet a comprehensive list of requirements, including specific dimensions, minimum mechanical competence, maximum total weight, specified mass distribution, durability and visual appearance. As these requirements highly depend on the designated use as well as the designated customers, manufacturers of wheels usually have to provide a variety of different wheel types.

In order to allow efficient (respectively economically justifiable) customization, wheels for vehicles are therefore often not integrally manufactured. Instead, the rim and wheel center may be prefabricated separately and then assembled, which e.g. allows combining different types of wheel centers with different types of rims. Thus, based on a certain rim type with specified dimensions a large variety of different wheel designs can be built up by using different types of wheel centers.

Such multipart wheel designs also offer the possibility of using different materials for rim and wheel center. Although this may also be done merely for esthetic reasons, such an approach can also be used in order to improve a wheel's performance. This can e.g. be achieved by reducing a wheel's moment of inertia, which has a significant impact on vehicle handling. Therefore, on the one hand, the total mass of a wheel has to be minimized. On the other hand, the fact must be taken into account that mass disposed away from the rotation axis contributes significantly more to the moment of inertia than mass close to the rotation axis. Hence decreasing the weight of the rim offers higher potential for improving the performance of a wheel than decreasing the weight of the wheel center.

Wheels with low weight and low moment of inertia therefore can be obtained by combining rims made from especially light materials with wheel centers made from more conventional materials. Therefore, pairings of different metals, including magnesium, aluminum, titanium or steel, may be chosen. Within the context of the present invention, "aluminum", "magnesium" and "titanium" should be understood as meaning also their alloys.

However also composite materials may be used in order to decrease the mass and moment of inertia of wheels even more if compared to designs using metals only. As such, fiber reinforced plastics comprising e.g. glass fibers, carbon fibers, aramide fibers, basalt fibers or combinations thereof may be used for rims and/or wheel centers. Such types of wheels made from fiber reinforced plastics and metals can be referred to as "hybrid wheels". A first type of hybrid wheels comprises a wheel center made from a metal, while the rim is made from a fiber reinforced plastic. A second type comprises a rim made from a metal, while the wheel center is made from a fiber reinforced plastic.

However, a major drawback of many wheels made from multiple materials is that a lot of material combinations which are advantageous from a structural mechanical point of view (e.g. regarding total weight, strength or stiffness) turn out to cause drawbacks regarding other requirements—such as electrochemical compatibility of the materials. For example, pairings of components made from a carbon fiber reinforced plastic and components made from aluminum often turn out to be critical with respect to electrochemical contact corrosion (although the same effect also occurs for other pairings of materials, such as pairings between some types of steel and aluminum). As a result of such corrosion phenomena, junctions between a rim and a wheel center may become stained, which for esthetic reasons is undesirable. But even more important, such corrosion phenomena decrease the mechanical durability of the junction and hence have a negative effect on the durability of the whole wheel.

Another drawback of wheels that are assembled of components made from different materials results from the fact that a junction between the two of them has to withstand very high brake and drive torque as well as it is exposed to cyclic loading when driving. Hence, designing the transition region between wheel center and rim such that load transfer cannot evoke critical stress concentrations can be very demanding if the rim and the wheel center are made from materials with highly differing mechanical material properties. This especially holds true for pairings of fiber reinforced plastics and metals. Epoxy resins which are widely used as matrices for fiber reinforced plastics have a much lower abrasion resistance, strength and hardness if compared to those of the metals typically used for hybrid wheels. Hence already minor inaccuracies in the geometry of the contact area (face) of the rim and/or wheel center can lead to non-optimal contact pressure distribution and thus cause local damage of the matrix and subsequent exposure of the embedded fibers. Damage of the matrix can have a significant impact on the mechanical competence of a composite component. In addition, exposure of fibers substantially promotes contact corrosion, in specific for a pairing between carbon fiber reinforced plastic and aluminum.

Therefore, phenomena related to contact corrosion and contact mechanics in the area of a junction between the wheel center and adjacent rim have a major impact on the durability of a wheel. However, these problems have not been addressed in the wheels known from the prior art.

For that reason, it is one object of the present invention to provide an improved wheel comprising a rim and a wheel center that are made as separate components and if appropriate from different materials. One aim of the invention is to provide a wheel which has an increased durability if compared to such wheels known from the prior art.

According to the invention, a wheel comprises a rim and a wheel center interconnected to the rim. Within the context of the present invention, "wheel center" should be understood as to include any type of wheel center, such as spoke structures—respectively wheel spiders—or wheel disks. The rim comprises at least one first contact area and the wheel center comprises at least one second contact area, which are in a mounted position aligned with respect to each other. According to the present invention an intermediate layer is arranged between the at least one first and the at least one second contact area. This intermediate layer at least partially prevents a direct contact between the first and the second contact area. The design and the functionality of the intermediate layer and variants thereof will be described in more detail herein after.

Highly durable wheels may be achieved if the intermediate layer completely prevents direct contact between the at least one first and the at least one second contact area. Due to such an intermediate layer, a direct physical—respectively electrochemical contact—can be completely avoided. Thereby contact corrosion can be efficiently prevented and/or the contact pressure can be more evenly distributed over the contact areas.

However, according to one variant of the invention, for some types of wheels the intermediate layer may allow direct contact between portions of the at least one first and the at least one second contact area. Such variants may by advantageous in order to optimize the distribution of contact pressure in some parts of the contact areas for material pairings which are actually not prone to contact corrosion.

According to one variant of the invention the intermediate layer is designed to prevent damaging of a protective surface layer on a first and/or second contact area. For fiber reinforced plastics, such a protective surface layer may be made from an epoxy resin or a finish in order to protect the subjacent fibers. For metals, the protective surface layer may be a finish or a passive layer (e.g. made from a polymer material), as e.g. may be present on aluminum or titanium. Depending on the application the presence of such a passive layer may be important e.g. to prevent corrosion phenomena.

In order to help to optimize load transfer between a wheel center and a rim, according to one variant of the invention an intermediate layer may comprise at least one load bearing area/section. Such a load bearing area may be a specific portion of the at least one intermediate layer, designed to allow proper load transfer. In another variant of the invention the whole intermediate layer serves as a load bearing area. In another variant of the invention, some parts of the intermediate layer are specifically designed for load transfer, while other parts do not (or at least not significantly) contribute to load-bearing. In order to optimize load transfer, a load bearing area may for example have a specific thickness and be made from a certain material that e.g. cause a more even distribution of contact stress.

If preferred, the intermediate layer comprises an electrically insulating material, which allows reducing—respectively preventing—contact corrosion phenomena even more. Such an electrically insulating material may be a plastic material, such as for example polystyrene (PS), polypropylene (PP), high-density polyethylene (HDPE) and low-density polyethylene (LDPE), polytetrafluoroethylene (PTFE), polyethylene terephthalate (PET), polyamides (PA), rubber or silicone. However, also other materials may be used, such as glass or ceramics.

Alternatively or in addition, the intermediate layer may also comprise fibers, such as glass fibers. For example, the intermediate layer may comprise a fabric made from glass fibers or a composite structure reinforced by glass fibers. Using glass fibers may be advantageous for providing good electrical insulation.

If appropriate, the intermediate layer can comprise at least one sealing area. Such a sealing area may be a (closed) sealing bead. In order to prevent moisture, air, salt, dust or other substances from entering into the interstitial space between the first and the second contact area, the sealing area may be arranged at the boundary of the intermediate layer, respectively circumferentially of the intermediate layer. Thus, intrusion and accumulation of corrosion-enhancing substances in the interstitial space can be prevented and the development of a local corrosive environment can be avoided.

Good results may be obtained if the sealing area comprises an elastic material or is made entirely from an elastic material. As a result, proper sealing can be ensured even if the junction is cyclically deformed when driving. Particularly good results for wheels may be obtained if the sealing area is made from a FKM or a vulcanized rubber or a silicone or a nitrile butadiene rubber (NBR) or an EPDM rubber or combinations thereof.

In a variant of the invention, the load bearing area and sealing area are the same area, hence the load bearing area is also acting as sealing area - respectively vice versa.

For some purposes the intermediate layer may comprise multiple layers made from different materials. As such it may comprise layers made from a continuum material, such as a plastic or metal, as well as layers made from a non-continuum material, such as a fabric, e.g. a fabric made from glass fibers. With such a multi-layered intermediate layer, efficient electrical insulation can be combined with e.g. good sealing and a more even distribution of contact stress.

In order to obtain a wheel which has a particularly long service life, even if used at high operating temperature, the intermediate layer may comprise a metal layer. The metal layer may be at least partially coated by a polymeric material. Thus a particularly even distribution of contact stress can be obtained. Good results may be obtained if the metal layer is fully coated by a polymeric material. For some applications, the metal layer may be made from a sheet metal by means of a stamping and/or deep drawing process. It turned out that in particular for high operating temperatures, such embodiments of intermediate layers show a much better resistance against shear stress if compared to other types of intermediate layers. Consequently, relative movements between rim and wheel center which otherwise would cause abrasion phenomena at the first and/or the second contact area, leading to increased corrosion due to the absence of passive surface layers—can be decreased. Thus, corrosion enhanced by abrasion can be significantly reduced. In particular, the metal layer may be made from a stainless steel. A coating with a polymeric material allows to obtain electrical insulation between the wheel center and the rim, leading to a decrease of corrosion phenomena. As well, such a coating may help to prevent intrusion and accumulation of corrosion-enhancing substances in this region of the wheel. As well it may help to decrease maximum con-tact stress between the intermediate layer and the first contact area and/or between the intermediate layer and the second contact area. Alternatively or in addition to a polymeric material, the coating may also be made from another material suited to obtain at least one of the effects stated above—e.g. a ceramic or a glass.

In order to allow for a direct load transfer between a wheel center and a rim, the intermediate layer may be a laminar intermediate layer, hence have a thickness that is relatively small if compared to the other dimensions of the intermediate layer.

For some purposes the intermediate layer may have a thickness that varies across its area. Thus the stress distribution and load transfer between the wheel center and the rim may be controlled, respectively optimized. Good results may be obtained if the intermediate layer has a mean thickness of about 0.5 mm to 2.0 mm. Intermediate layers with such a thickness offer for many materials sufficient electrical insulations and optimal stress distribution, without deteriorating load transfer between the wheel center and the rim.

An intermediate layer may be a preformed three-dimensional body, hence already be at least partially preformed to the shape of the at least one first and/or the at least one second contact area. This facilitates assembly of a wheel. Good results may be obtained if the intermediate layer is at least partially made by a stamping and/or deep drawing process. As a starting material for such a stamping and/or deep drawing process, e.g. a sheet metal or a plastic sheet may be used.

Alternatively or in addition an intermediate layer may also be made from a relatively elastic material which allows the intermediate layer to be draped on a contact area prior to the final assembly of the wheel. As such it may be draped on the at least one second contact area or on the at least one first contact area before the wheel center and the rim are joint together.

In a variant of the invention the intermediate layer is connected to the at least one second contact area or on the at least one first contact area using an adhesive. Thus an intermediate layer's position relative to a contact are can reliably be maintained during assembly.

If appropriate, an intermediate layer is made using an injection-molding process. Good results may be obtained if an intermediate layer is made using multi-component injection molding. Such a variant of the invention may be advantageous in order to produce intermediate layers that comprise bearing areas and sealing areas made from different materials. Hence such types of intermediate layers may be made using a two-component injection molding system. Such integral types of intermediate layers may help to facilitate the assembly of a wheel.

Alternatively a sealing area may be vulcanized onto a bearing area, or vice versa.

According to one variant of the invention, at least one connection element interconnects the at least one first and the at least one second contact area. Good results may be obtained if such a connection element comprises a screw or a bolt or a rivet. It is clear that in the context of the present invention also multiple connection elements and combinations thereof, for example multiple screws and/or bolts, may be applied in order to interconnect a first and a second contact area.

For some special types of wheels, the intermediate layer may serve as a connection element. Therefore, the intermediate layer may be an adhesive or may comprise an adhesive, mechanically interconnecting the at least one first contact area and the at least one second contact area.

For some applications, a wheel according to the invention may comprise a connection element that protrudes the at least one intermediate layer. Such connection elements may be used in order to improve load transfer between the wheel center and the rim.

Connection elements, respectively e.g. screws, may be arranged in different ways, including those shown in EP 1 858 715 B1. For some special types of wheels, such as wheels used for motorcycles, a connection element may protrude the rim at the rim well. For some other applications a connection element may protrude the rim in a region between the rim well and the outer hump. For other applications, a connection element may protrude the rim in a region between the outer hump and the outer rim edge. However, the present invention is not limited to such arrangements of connection elements.

Good results may be achieved if connection elements, such as e.g. screws, are aligned essentially perpendicular to the intermediate layer. Hence static friction between the at least one first and the at least one second contact area can be increased which allows improving torque transmission between a wheel center and a rim.

For variants comprising multiple connection elements, the individual connection elements may be aligned in different ways. Hence e.g. one contact area may comprise multiple screws aligned in multiple directions in order to allow optimal transmission of torque as well as of radial forces.

Thus, the present invention allows to build wheels made from a variety of pairings of materials, including pairings made of steel, aluminum, magnesium, titanium, fiber reinforced plastic with a fiber material made from carbon, polymer (e.g. aramide), glass, stone e.g. basalt or metal (e.g. steel) or combinations thereof.

Hence, the present invention may be used for wheels which have a wheel center and a rim made from different materials. However, the present invention may in principle also be used for wheels whose rim and wheel center are made from the same material, e.g. in order to prevent corrosion fatigue due to cyclic loading when driving.

Good wheel performance with respect to load transfer and durability may be obtained if at least one insert is arranged in the rim, said at least one insert extending from the rim into the wheel center. Such an insert may be advantageous in order to improve load transfer between a wheel center and a rim. For example, the insert may be a bushing. Such a bushing may surround a screw which is acting as a connection element. Thus, a connecting screw can be protected from critical bending moments as well as shearing.

Good results may be obtained if a bushing comprises a flange that may serve as a washer to distribute the force applied by a connecting screw's head to the rim.

If appropriate, an insert may be made from an electrically insulating material. In such a variant of the invention, contact corrosion between the insert, the rim and the wheel center can be prevented.

If a screw or similar type of connection element is present, one or multiple seals—such as o-rings—may be arranged between the screw's head and the rim (and/or the bushing, if present) in order to prevent moisture and air from entering the space between connection element, rim and bushing.

Alternatively or in addition, an adhesive may be inserted in the junction region between the wheel center and the rim in order to at least improve sealing of this region. Thus, intrusion of moisture into the space between connection element, rim and bushing (of present) and/or leakage of pressurized gas from the tire/rim volume can be at least decreased. The connection element may be at least partially embedded in such an adhesive. Good results may be obtained if the wheel comprises a bushing and the adhesive is inserted in said junction region before the bushing and the connection element are mounted. Good results can be obtained if polyurethane adhesives are used.

A further independent inventive concept relates to a barrier layer to support prevention of leakage of pressurized gas from the tire/rim-volume of a wheel that is at least partially made from a composite material. It turned out that temperature cycles such as caused by braking as well as cyclic loading when driving may result in critical microdamage of the composite material over time. In particular such cyclic phenomena may induce microcracks in the matrix of a fiber reinforced plastic, leading to leakage of pressurized gas from the tire/rim-volume though the rim and/or wheel center. Consequently, the service life of such wheels is decreased, although their structural competence would still meet the mechanical requirements that apply to them. According to this independent inventive concept, at least a part of the rim's surface which is directed to the wheel is coated with a barrier layer that is impermeable to the gas to be filled in the tire/rim-volume, in particular with a layer made from a polymeric substance. Good results may be obtained if the whole surface is coated. Thus, stress corrosion cracking can be reduced and leakage of pressurized gas through microcracks can be at least reduced. Good results may be obtained if the barrier layer comprises a material that has a higher elasticity (elastic modulus) than the matrix of the fiber reinforced plastic, e.g. a silicone material, in particular a silicone varnish. Using a material with a relatively high elasticity allows reliable sealing of microcracks (or even larger cracks) that open due to cyclic loading or changes in wheel temperature. For some applications, the barrier layer may comprise multiple layers made from the same and/or from different materials. In one embodiment, the barrier layer comprises a layer that increases friction of the tire mounted on the rim. Hence relative movements between the tire and the rim can be prevented.

It will be appreciated, that the barrier layer described herein is an independent inventive concept which is usable in wheels made at least partially from composite materials—in particular from fiber reinforced plastics—which do not necessarily comprise an intermediate layer as disclosed herein.

BRIEF DESCRIPTION OF SEVERAL VIEWS OF THE DRAWINGS

The herein described invention will be more fully understood from the detailed description of the given herein below and the accompanying drawings, which should not be considered as limiting the invention described in the appended claims.

FIG. 6 shows an embodiment of a junction between a wheel center and a rim, which was separated from the rest of the wheel for illustrative purposes, in a perspective view;

FIG. 7 shows the embodiment of a junction between a wheel center and a rim that is partially disassembled for illustrative purposes, in a perspective view;

FIG. 8 shows the embodiment of a junction between a wheel center and a rim in a partially disassembled state with the rim being partially cut for illustrative purposes, in a perspective view;

FIG. 9 shows detail C of FIG. 8;

DETAILED DESCRIPTION OF THE INVENTION

The foregoing summary, as well as the following detailed description of the preferred embodiments, is better understood when read in conjunction with the appended drawings. For the purposes of illustrating the invention, an embodiment that is presently preferred, in which like numerals represent similar parts through-out the several views of the drawings, it being understood, however, that the invention is not limited to the specific methods and instrumentalities disclosed.

Figure 1:
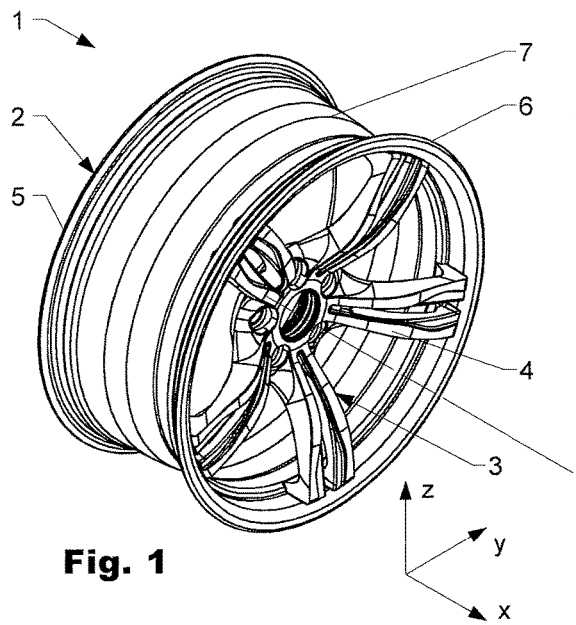
FIG. 1 schematically shows an embodiment of a wheel in a perspective view from the front, the side and above.
Figure 2:
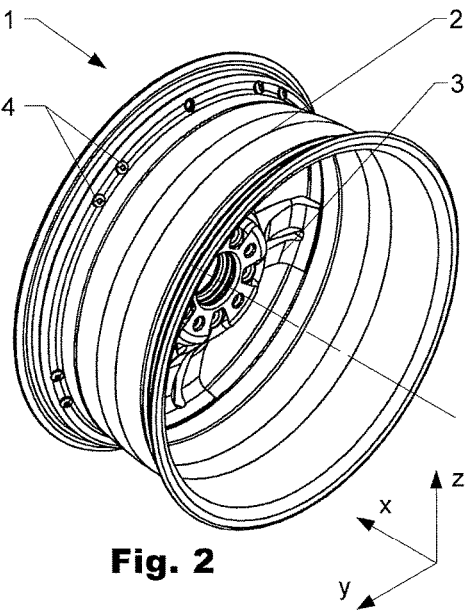
FIG. 2 shows the embodiment of a wheel from the back, the side and above.

FIGS. 1 and 2 show an embodiment of a wheel 1 according to the invention. The wheel 1 comprises a rim 2 made from a fiber reinforced plastic, such as a car-bon fiber reinforced plastic. In addition, the rim 2 comprises a rim well 7 which is arranged between an inner rim edge 5 and an outer rim edge 6, suited to receive a tire (not shown). The wheel 1 further comprises a wheel center 3 that comprises a hub which can be connected to a vehicle's wheel suspension (not shown) and a serves as a support for the rim 2. In the embodiment shown in FIGS. 1 and 2, the wheel center 3 is a wheel spider that has five spokes 4. The wheel center 3 and the rim are connected by means of screws 24, as will be described in further detail below.

Figure 3:
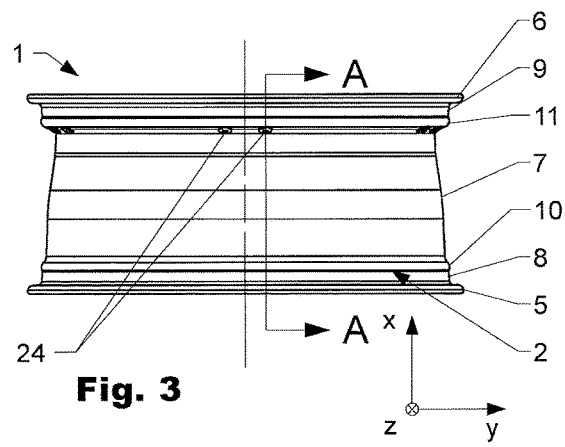
FIG. 3 shows the embodiment of a wheel in a bottom view.

In FIG. 3 the embodiment of a wheel 1 is shown in a bottom view. As can be clearly seen, the rim 2 comprises an inner and an outer rim edge 5, 6 as well as an inner and an outer rim shoulder 8,9, an inner and an outer hump 10, 11 and a rim well 7. The wheel center 3 is connected to the rim 2 by means of screws 24 which in the embodiment shown are located between the outer hump 11 and the rim well 7.

Figure 4:
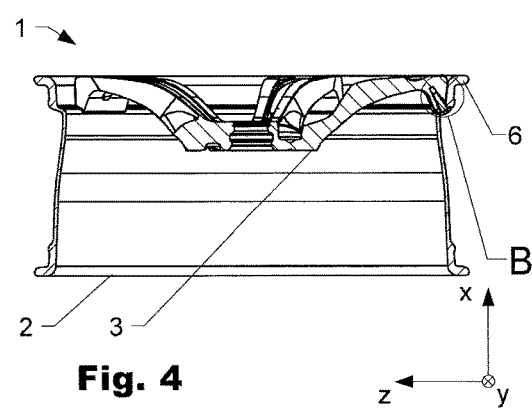
FIG. 4 shows cross-section AA of FIG. 3.

FIG. 4 shows cross-section AA of FIG. 3 and hence the junction between the wheel center 3 and the rim 2 in this embodiment of a wheel 1 in more detail. The junction is shown in greater detail in FIG. 5, which shows detail B of FIG. 4.

As can be seen, the wheel center 3 is fastened to the rim 2 in the region of the outer shoulder 9, respectively the outer rim edge 6 and the outer hump 11. The rim 2 comprises on its centripetal side (radially inwards) a first contact face 12 which is spaced apart but still relatively close to a second contact face 13, located on the centrifugal side (radially outwards) of the spokes 4. The second contact face at least partially aligns to the first contact face 12. Between the rim 2 and the spokes 4 (respectively the first and the second contact face 12, 13) an intermediate layer 22 is arranged. Said intermediate layer 22 is on a first (centrifugal) side contacted by the first contact face 12 of the rim 2 and on the second (centripetal) side contacted by the second contact face 13 of the spoke 4. Thus the intermediate layer prevents a direct physical contact between the first and the second contact face 12, 13.

At the outer boundary of the intermediate layer 22, a sealing area 23 is arranged, said sealing area 23 preventing moisture, dust and air from entering the region between rim 2 and spokes 4 (respectively wheel center). The sealing area 23 may also be referred to as a sealing bead. In a mounted state, the sealing area is clamped between the first and second contact face 12, 13 and slightly deformed, allowing a sufficient sealing effect. Therefore in the embodiment shown, the sealing area 23 is made from an elastic material, such as vulcanized rubber. Due to the elastic material properties, a reliable sealing can be provided, even if cyclic deformations of the junction—e.g. due to rotations of the wheel when driving—are present. For illustrative purposes, the sealing area 23 in FIG. 5 is shown in an undeformed (non-squeezed) state.

Figure 5:
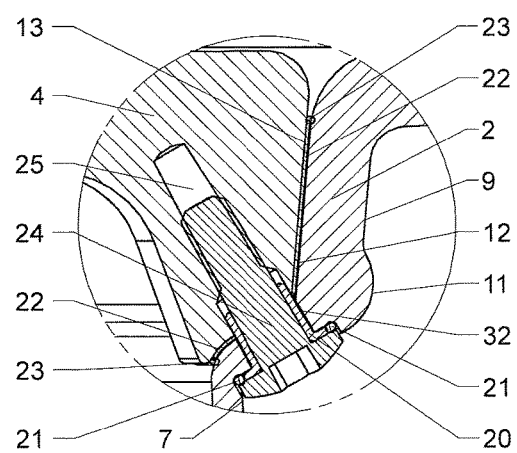
FIG. 5 shows detail B of FIG. 4.

As can be seen in FIG. 5, the sealing area 23 may be arranged at a location where the gap (interstitial space) between rim 2 and wheel center 3 starts to widen. Such a widening gap allows better drying and cleaning—respectively an increased removal of moisture and dust—of the boundary region between rim 2 and wheel center 3 that is neither separated by the intermediate layer 22 nor the sealing area 23.

The mechanical connection between rim 2 and wheel center 3 is mostly established by screws 24 that are inserted into a stepped bore 25 in the spokes 4 of the wheel center 3, as shown in FIG. 5. In the embodiment shown in FIGS. 5 to 9, a flanged bushing 20 is arranged on the screw 24, extending from the stepped bore 25 to the port 32 of the rim 2. The flanged bushing 20 helps in transferring drive and/or brake torque from the wheel center 3 to the rim 2. The flanged bushing 20 may also serve as an electrical insulator preventing contact corrosion between the screw (respectively the electrode potential of the wheel center 3 and the screw 24) and the rim 2. Between the rim 2 and the screw's 24 head there is an o-ring 21 which prevents moisture from entering in the space between screw 24, rim 2 and spoke 4. In addition the o-ring 21 can also serve as an electrically insulating element, preventing contact corrosion between the screw's 24 head and the rim 2.

As can be seen in FIG. 6, such as screw-type of connection may be located in the transition region between the outer rim shoulder 9 (respectively the outer hump 11) and the rim well 7. Such a setup has the advantage that the wheel center 3 can be positioned close to the outer rim edge 6 (in x-direction)—offering a maximum of free space in the center of the wheel 1 available for brakes etc., while not interfering with the tire beads (not shown) that in a mounted state will be located on the inner and outer rim shoulder 8, 9.

As shown in FIGS. 7 to 9, the first contact face 12, second contact face 13 as well as the intermediate layer 2 will in some embodiments have a shape corresponding with one another. As can be seen in FIG. 9, the flanged bushing 20 may be inserted such that its flange 31 is in contact with a shoulder 26 arranged in a stepped port 32 of the rim 2. An o-ring 21 then may be in mounted state be squeezed between the screw's 24 head (not shown) and the shoulder 26 of the stepped port 32. Such an assembled arrangement is shown in FIG. 5.

Figure 10:
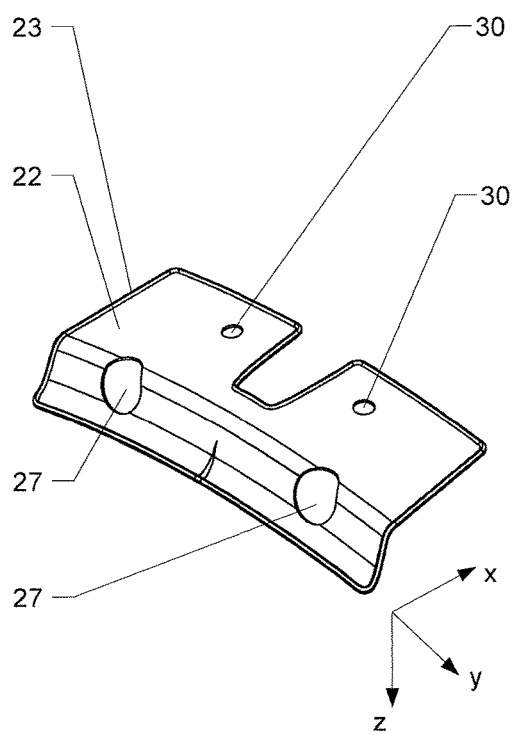
FIG. 10 shows an embodiment of an intermediate layer with a sealing area, in a perspective view.
Figure 11:
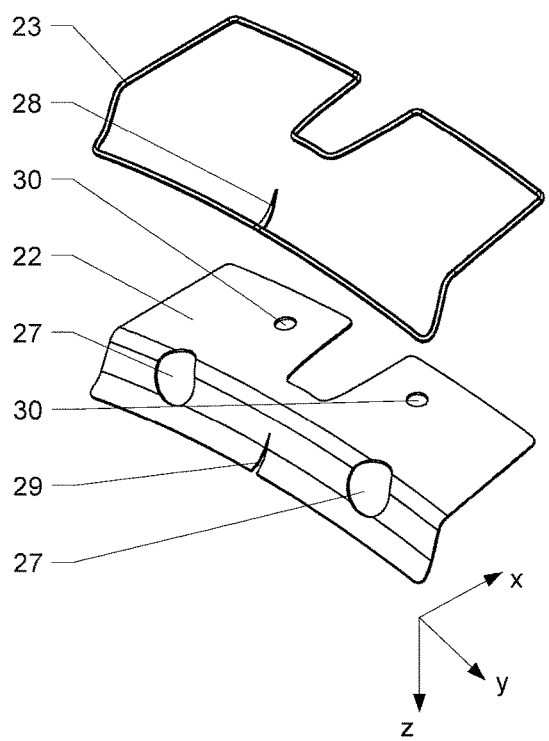
FIG. 11 shows an embodiment of an intermediate layer with a sealing area in a disassembled state, in a perspective view.

FIGS. 10 and 11 show an embodiment of an intermediate layer 22 that comprises a sealing area 23 as may be used for an embodiment of a wheel as shown in FIGS. 1 to 9. The intermediate layer 22 may have an essentially laminar design and be bent in order to conform to the adjacent rim 2 and center wheel 3, respectively align to their shape. The shown embodiment of an intermediate layer 22 also comprises two ports 27 where the intermediate layer 22 may be protruded by screws 24 and/or bushings 20, as shown in the Figures before. In addition, the intermediate layer 22 may also comprise openings 30 which may serve in order to position the intermediate layer 22 with respect to the wheel center 3 and/or rim 2 and hence facilitate the assembly of the wheel 1. At the outer boundary of the intermediate layer 22 a sealing area 23 is arranged. As shown in FIG. 11, the sealing area 23 may be detachable from the intermediate layer 22.

In order to provide a sufficient fixation of the sealing area 23 and hence maintain positioning in order to ensure proper sealing over time, the sealing area 23 comprises a wedge 28 which extends into the intermediate layer 22. The intermediate layer 22 comprises a recess 29 that has a shape which is corresponding to the wedge 28 of the sealing area. Such an arrangement of wedge 28 and corresponding recess 29 allows keeping the sealing area 23 in place over time, which is important as the sealing area 23 will usually be located at a boundary region of a gap between rim 2 and wheel center 3, where the gap is widening and a hence the sealing area 23 may slip out of the gap. As shown in FIGS. 10 and 11, such wedges 28 may be used at regions which are in a certain distance from the corners of the sealing area 23, as edges serve as some type of fixation for the adjacent part of the sealing area 23.

In addition the recess 29 allows a better alignment of the intermediate layer 22 to the first and second contact area 12, 13.

The invention claimed is:

1. A wheel (1) comprising:
   a. a rim (2) and a wheel center (3) interconnected to the rim (2);
   b. wherein the rim (2) comprises at least one first contact area (12) and the wheel center (3) comprises at least one second contact area (13) which are in a mounted position aligned with respect to each other;
   c. at least one insert. (20) arranged in the rim (2), said at least one insert (20) extending from the rim (2) into the wheel center (3); and wherein
   d. an intermediate layer (22) is arranged between the at least one first contact area (12) and the at least one second contact area (13) preventing at least partially direct contact between the at least one first contact area (12) and the at least one second contact area (13).

2. The wheel (1) according to claim 1, wherein the intermediate layer (22) completely prevents direct contact between the at least one first contact area (12) and the at least one second contact area (13).

3. The wheel (1) according to claim 1, wherein the intermediate layer (22) comprises at least one load bearing area/ section.

4. The wheel (1) according to claim 1, wherein the intermediate layer (22) comprises at least one sealing area (23).

5. The wheel (1) according to claim 4, wherein the at least one sealing area (23) is arranged circumferentially of the intermediate layer (22).

6. The wheel (1) according to claim 5, wherein the at least one sealing area (23) comprises an elastic material.

7. The wheel (1) according to claim 6, wherein the elastic material comprises at least one of a FKM, a vulcanized rubber, a silicone, a nitrile butadiene rubber (NBR), and an EPDM rubber.

8. The wheel (1) according to claim 1, wherein the intermediate layer (22) comprises a metal layer.

9. The wheel (1) according to claim 8, wherein the metal layer is coated by a polymeric material and/or a ceramic and/or a glass.

10. The wheel (1) according to claim 1, wherein at least one connection element (24) interconnects the at least one first contact area (12) and the at least one second contact area (13).

11. The wheel (1) according to claim 10, wherein the connection element (22) protrudes the at least one intermediate layer (24).

12. The wheel (1) according to claim 10, wherein the connection element (24) comprises a screw or a bolt or a rivet.

13. The wheel 1) according to claim 12, wherein the connection element (24) protrudes the rim (2) at the rim well (7) or in a region between the rim well (7) and the outer hump (11) or in a region between the outer hump (11) and the outer rim edge (6).

14. The wheel (1) according to claim 12, wherein the connection element (24) is essentially perpendicular to at least part of the intermediate layer (22).

15. The wheel (1) according to claim 10, wherein the connection clement (24) is at least partially embedded in an adhesive.

16. The wheel (1) according to claim 10, wherein the at least one insert (20) surrounds the at least one connection element (24).

17. The wheel (1) according to claim 16, wherein the insert (20) comprises a bushing.

18. The wheel (1) according to claim 1, wherein the intermediate layer (22) comprises an adhesive than mechanically interconnects the at least one first contact area (12) and the at least one second contact area (13).

19. The wheel (1) according to claim 1, wherein the rim (2) and/or the wheel center (3) comprise a material chosen from the group consisting of steel, aluminum, magnesium, titanium, fiber reinforced plastic with a fiber material made from carbon, aramide, glass, basalt, steel.

20. The wheel (1) according to claim 1, wherein the rim (2) and the wheel center (3) are made from different materials.

21. The wheel (1) according to claim 1, wherein the intermediate layer (22) comprises an electrically insulating material.

22. The wheel (1) according to claim 21, wherein the electrically insulating material comprises at least one of a rubber and/or a silicone and/or glass fibers and/or a ceramic.

* * * * *